Dec. 2, 1952 W. A. SCHAICH 2,620,234
CHEMICAL SPRAY ATTACHMENT FOR WATERING HOSES
Filed June 13, 1950

INVENTOR.
Wilbur A. Schaich

Patented Dec. 2, 1952

2,620,234

UNITED STATES PATENT OFFICE 2,620,234

CHEMICAL SPRAY ATTACHMENT FOR WATERING HOSES

Wilbur A. Schaich, Franklin, Mich., assignor to Dearborn Motors Corporation, Highland Park, Mich., a corporation of Delaware Application June 13, 1950, Serial No. 167,880

6 Claims. (Cl. 299—85)

1

This invention relates to a fluid mixing device and provides a method and apparatus for effecting the introduction of a metered amount of toxic fluid into any spraying system providing a pressured flow of water. In particular, the method and apparatus of this invention permits the automatic metered mixing of a toxic fluid into a stream of water for discharge by a conventional hose nozzle and thus permits the spraying of lawn and garden areas, trees or any other surface, to be accomplished by the simple expedient of connecting an ordinary garden type hose to the domestic water pressure system.

In recent years, unusually effective weed killing and insect destroying compositions have been introduced which utilize water as a carrier liquid for application of the toxic compositions in spray form to the material to be treated. However, the toxicity of such compositions is so great that unusual care has to be taken with conventional spraying apparatus to add just the right proportions of toxic fluid to the carrier fluid so as to not produce a concentration harmful to the crop, lawn or animal on which the spray is to be applied. Additionally, great care has to be taken to insure the thorough cleaning of the spraying apparatus after its use with one type of spray so that the residue of toxic element of such spray would not contaminate and injure other types of crops to which a different spray was subsequently applied by the same apparatus.

So far as the ordinary householder is concerned, who had only a small lawn or garden area to be treated, spraying has been a difficult and tedious job, for he had to first carefully measure a quantity of the toxic fluid and mix such into the required volume of water, and then carry a tank of the mixed fluids on his back during the spraying operation. The only way he could avoid this latter laborious feature was to invest in a portable spraying rig which are so high in cost compared to the number of times that they would be used by the average householder as to make them an impractical investment.

Accordingly, it is an object of this invention to provide an improved mixing device which will automatically effect the accurate metered mixing of small quantities of toxic fluid into water or any other carrier fluid.

A particular object of this invention is to provide a fluid mixing device which may be applied to the end of an ordinary garden hose and which will effect the continuous introduction of a desired quantity of toxic fluid into the stream of water passing through such hose so that a conventional nozzle on the end of the hose may be utilized to apply weed killing or insect killing sprays to lawn or garden areas. In other words, this invention provides a method and apparatus of fluid mixing which permits the spraying of an area by a water carried toxic to be accomplished automatically and concurrently with the watering of such area by a hose connection to the ordinary domestic water system.

A further object of this invention is to provide a continuous toxic fluid mixing device for application to domestic water systems which will not contaminate any portion of the water system to which it is connected with the toxic fluid.

Still another object of this invention is to provide a small, light-weight, inexpensive fluid mixing device which may be connected between the hose and nozzle of an ordinary garden hose, and which will function to continuously and automatically introduce a desired amount of toxic fluid into the water spray discharged by the hose nozzle.

The specific nature of this invention, as well as other objects and advantages thereof, will become apparent to those skilled in the art from the following detailed description, taken in conjunction with the attached sheets of drawings on which, by way of preferred example only, are illustrated two embodiments of this invention.

Figure 1:
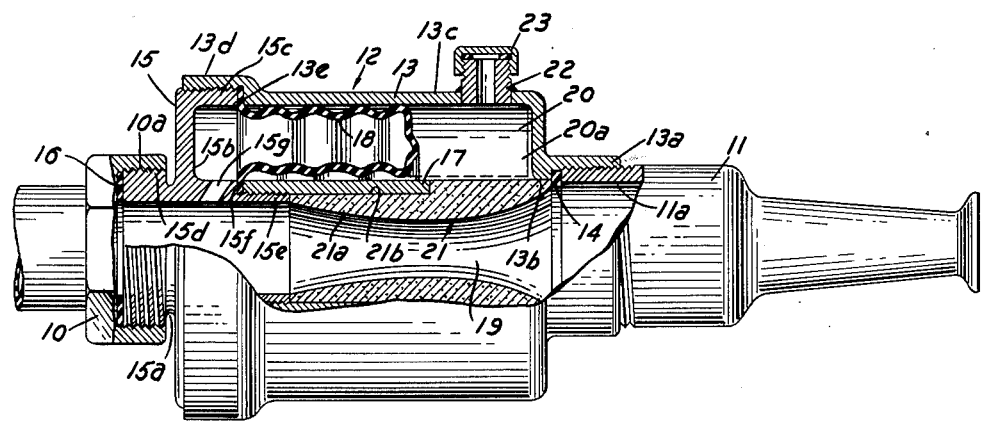
Fig. 1 is an elevational view, partly in section, of a fluid mixing device embodying this invention shown in assembled relationship between a garden hose and a hose nozzle.

Numeral 10 indicates a female coupling of the type conventionally provided on the end of a garden hose or other connection to domestic water systems, while the numeral 11 indicates a spray producing nozzle of the garden or nozzle type having a threaded male connection portion 11a. In accordance with this invention, a mixing unit 12 is threadably connected intermediate the water source coupling 10 and the spray nozzle 11, and such mixing unit automatically and continuously effects the introduction of the required quantity of toxic fluid into the water passing through the hose 10 and nozzle 11 and discharged as a spray from the end of nozzle 11.

The particular construction of hose nozzle 11 obviously forms no part of this invention and hence will not be described in detail.

The mixing unit 12 comprises a hollow cylindrical container 13 having a reduced diameter, internally threaded end portion 13a which cooperates with the threaded end 11a of the hose nozzle 11 to effect a sealed connection of the hose nozzle thereto. Fluid leakage through the threaded portions 11a and 13a is eliminated by a rubber washer 14 which seats against a radial face of an inwardly projecting, annular shoulder 13b formed in the container 13. The central portion 13c of container 13 is of cylindrical configuration and terminates in a large diameter, internally threaded end portion 13d in which is threadably mounted a cap 15.

Cap 15 has a central hub portion 15a and a radially projecting flange portion 15b which terminates in a threaded cylindrical portion 15c which cooperates with the threaded portion 13d of container 13 as previously mentioned. The outwardly disposed axial end of hub portion 15a is threaded as indicated at 15d and such threads cooperate with the threads 10a provided in the hose coupling 10. A sealing washer 16 is bottomed in the hose coupling 10 to prevent leakage between the cooperating threads. Hub portion 15a also extends axially inwardly a substantial distance into container 13 and, at its innermost end, is provided with external threads 15e on which is mounted the internally threaded end of a sleeve-like partition 17.

An annular flexible diaphragm 18 has its inner periphery clamped between the end of partition sleeve 17 and a radial shoulder 15f formed on the hub portion 15a at the end of the threads 15e. The outer periphery of diaphragm 18 is clamped between the end face of the threaded portion 15c of cap 15 and the radial face 13e formed at the juncture of the enlarged threaded portion 13d with the central portion 13c of the container 13. The diaphragm 18 is preferably formed of rubber or rubber-like composition and hence functions as a fluid seal between the cap 15 and the container 13, as well as between the cap 15 and the sleeve 17.

The hub portion 15a of the cap 15 together with the partition sleeve 17 serve to divide the interior of the container 13 into two compartments, namely, a central compartment 19 which provides a through fluid passage from the water source hose 10 to the hose nozzle 11, and a surrounding annular compartment 20. Within the central through passage 19 a pressure reducing device 21 is mounted which may be of any one of several conventional formations, but is illustrated as comprising a cylindrically shaped element having a bore surface 21a defining a Venturi nozzle. For convenience in mounting the pressure reducing device 21, a portion of its periphery may be reduced in diameter as indicated at 21b to permit it to be snugly inserted within the bore of the partition sleeve 17. Additional bearing support for the pressure reducing element 21 may be provided by the peripheral surface of the inwardly projecting rib 13b of the container 13, and this surface juncture is also sealed against leakage by the sealing washer 14.

It is therefore apparent that the pressure of the fluid flow at any points beyond the minimum diameter bore portion of the Venturi nozzle 21a will be substantially reduced below the pressure of the fluid entering the container 13. The full pressure of the entering fluid is applied at the left hand or outer side of the flexible diaphragm 18 in any convenient manner, such as through radial passages 15g formed in the hub portion 15a of the cap 15. It will thus be seen that the flexible diaphragm 18 effectively provides a sealed chamber 20a at the right hand end of the compartment 20 which chamber is completely isolated from the fluid entering the mixing unit but is subjected to the full pressure of such entering fluid by the action of the flexible diaphragm 18 which, in effect, operates as a movable wall for chamber 20a.

In accordance with this invention, the chamber 20a is filled with the toxic fluid of the spray mixture in any convenient manner, such as by a filling tube 22 which is radially mounted in the central portion 13a of container 13 and closed by a suitable cap 23. Accordingly, the toxic fluid inserted in chamber 20a is subjected to the full pressure of the entering fluid, which pressure will be higher than the fluid pressure existing in the discharge end of the Venturi nozzle bore 21a.

As described and claimed in the co-pending application of Raymond J. Miller, Serial No. 145,528, filed February 21, 1950, assigned to the assignee of the present application, a metered mixing of a toxic fluid into a carrier fluid may be automatically and accurately accomplished by subjecting the toxic fluid to a higher pressure than the carrier fluid and interposing between such fluids a porous barrier mass of sintered metal particles. Such barrier mass will then function to introduce a metered amount of toxic fluid into the carrier fluid, and the amount introduced per unit of time is a determinable function of the porosity of the sintered metal mass, the pressure differential between the toxic fluid and the carrier fluid, and the viscosity of the toxic fluid. This principle may be conveniently employed in the described apparatus to effect the introduction of a metered quantity of a toxic fluid contained in the chamber 20a to the carrier fluid or water passing through the central fluid passage 19, by the simple expedient of forming at least a part of the barrier wall or partition between the central fluid passage 19 and the confined fluid toxic chamber 20a, of porous sintered metal material. In the particular embodiment of this invention illustrated in the drawings, this is most conveniently accomplished by forming the entire pressure reducing element 21 of a porous sintered metal composition. Since such sintered metal compositions are generally formed by casting techniques, the Venturi nozzle bore 21a may be conveniently produced without machining in the initial casting of the sintered metal mass. In any event, the sintered metal barrier mass should be positioned between the confined chamber 20a and the low fluid pressure regions of the central fluid passage 19. The Venturi nozzle 21a is designed so that the pressure differential existing between the entering pressure of the fluid and the fluid pressure in the discharge end of the nozzle bore 21 will be sufficient to continuously introduce the required amount of toxic fluid into the carrier fluid passing in to the hose nozzle 11. The diaphragm 18 is, of course, constructed of sufficient width and flexibility so as to permit it to expand to the dotted line position shown in the drawings, wherein it substantially fills the chamber 20a and thus insures that the mixing device will continue to function until substantially all of the toxic fluid introduced into the chamber 20a is forced through the porous sintered metal mass into the carrier fluid.

It is apparent that the particular apparatus illustrated in Fig. 1 of the drawings is but one of several different types which may be employed to carry out the fundamental method of this invention. Concisely stated, the method of this invention starts with a pressured carrier fluid and then produces a flow of such carrier fluid through a pressure reducing device. A toxic fluid is then subjected to substantially the full pressure of the carrier fluid and a porous mass is disposed intermediate the toxic fluid and the low pressure regions of the primary fluid flow.

Figure 2:
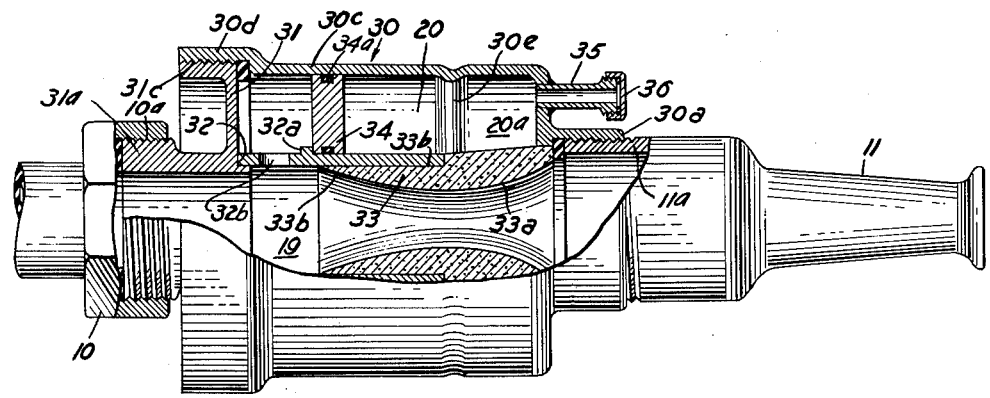
Fig. 2 is an elevational view, partly in section, of a modified form of fluid mixing device embodying this invention shown in assembled relationship between a garden hose and a hose nozzle.

Referring now to Fig. 2, a modified mixing unit construction is there disclosed which employs a slidable annular piston to form the movable wall between the toxic fluid chamber and the pressured primary fluid. Such mixing unit is again threadably mounted intermediate a conventional hose coupling 10 and hose nozzle 11 and comprises a hollow cylindrical container 30 which is of generally similar configuration to the container 13 and has an internally threaded reduced diameter end portion 30a cooperating with the threaded end 11a of the hose nozzle 11. The central portion of container 30 is of cylindrical shape and the other end thereof is enlarged as indicated at 30d and internally threaded to receive the threaded portion 31c of the cap 31. Cap 31 has a central hub portion 31a which is externally threaded at one end to engage in the threaded bore 10a of the hose coupling 10. The other end of hub portion 31a projects slightly inwardly with respect to the radial flange portion 31b and provides a mounting for a partition sleeve 32. A combination pressure reducing device and fluid mixing element 33 is provided which is formed from a porous mass of sintered metal particles and is of hollow cylindrical configuration with a Venturi-shaped bore 33a. The outer surface of the sintered metal mass 33a is reduced in diameter as indicated at 33b and is pressed into the interior of partition sleeve 32. As before, the partition sleeve 32 and the sintered metal mass 33 cooperate to divide the interior of container 30 into two compartments, respectively, a central through compartment 19 and a surrounding annular compartment 20. Radial apertures 32b may be provided in sleeve 32 to connect the two compartments.

An annular piston 34 is slidably mounted within the container 30 with its outer periphery snugly engaging the interior walls of the central portion 30c of the container 30 and its inner periphery snugly engaging the outer surface of partition sleeve 32. Sealing rings 34a may be provided in the peripheral surfaces of piston 34. The extent of axial movement of piston 34 may be limited in any convenient manner, such as by an outwardly projecting rib 32a formed near the left hand end of the partition sleeve 32 and an inwardly projecting rib 30e formed near the right hand end of the container 30. The annular piston 34 thus functions as a movable wall for a confined chamber 20a formed in the right hand end of the annular outer compartment 20. Toxic fluid may be introduced into the chamber 20a through a filler pipe 35 which is mounted in the radial wall of container 30 which communicates between the central portion 30c and the threaded end portion 30a. A cap 36 is provided for filler pipe 35. The disposition of filler pipe 35 in generally axially parallel relationship with respect to the container 30 permits a rod or wire to be inserted through such filler pipe to push the piston 34 back to its extreme left hand position prior to introduction of toxic fluid into the confined chamber 20a. When such chamber is filled with toxic fluid, it is apparent that the toxic fluid is subjected to the full pressure of the fluid entering the mixing unit. Furthermore, the porous mass 33 has a portion of itself disposed between the toxic fluid chamber 20a and the lower pressure regions of the through central passage regions 19. Accordingly, a metered discharge of toxic fluid into the carrier fluid passing through the central fluid passage 19 will be produced.

From the foregoing description, it is apparent that the method and apparatus of this invention permits the introduction of a toxic fluid into a spray to be accomplished most conveniently, accurately and inexpensively. Since the mixing units embodying this invention obviously do not permit any contamination of the fluid pressure system to which they are connected, the cleaning of such mixing units when switching from one type of spray to another may be avoided merely by providing a spray mixing unit for each type of spray that is to be used. More than that, this invention provides a complete, highly accurate spraying device for the householder, which may be connected to his ordinary garden hose and operated from his domestic water system, and which he may utilize with no more effort than is involved in watering a lawn or garden. Obviously, if desired, the mixing device of this invention may be mounted in connection with stationary sprinkling devices so that concurrently with the watering of a garden area, a desired weed killing or insect destroying spray may be applied.

It will, of course, be understood that various details of construction may be varied through a wide range without departing from the principles of this invention and it is, therefore, not the purpose to limit the patent granted hereon otherwise than necessitated by the scope of the appended claims.

I claim:

1. A self metering fluid mixing device comprising a hollow container adapted for connection at one end to a source of pressured primary fluid, partition means in said container dividing the interior thereof into a central through fluid passage and a surrounding annular compartment exposed at one end to primary fluid entering said container, an axially movable barrier subjected at one side to the pressure of the primary fluid and cooperating with said annular compartment to define an enclosed chamber at the other end of said container adapted to contain a secondary fluid, whereby the secondary fluid is isolated from the primary fluid but subjected to the entering pressure of the primary fluid, said partition means including a Venturi nozzle section having the bore thereof disposed in the path of primary fluid flow in said central fluid passage for reducing the pressure of the primary fluid flowing therethrough, and a porous fluid-permeable mass of sintered metal particles forming part of said partition means and disposed intermediate said chamber and the low pressure portion of said central fluid passage, secondary fluid being forced through said porous mass into said central fluid passage by movement of said barrier in said annular compartment, whereby said porous mass normally separates secondary fluid from the primary fluid but accommodates flow of secondary fluid therethrough.

2. A self metering fluid mixing device comprising a hollow container adapted for connection at one end to a source of pressured primary fluid, partition means in said container dividing the interior thereof into a central through fluid passage and a surrounding annular compartment exposed at one end to primary fluid entering said container, an axially movable barrier having an annular wall cooperating with said annular compartment to define an enclosed chamber at the other end of said container adapted to contain a secondary fluid, whereby the secondary fluid is isolated from the primary fluid but subjected to the entering pressure of the primary fluid, said partition means including an annular porous mass of sintered metal particles defining a Venturi nozzle disposed in said central fluid passage for reducing the pressure of the primary fluid flowing therethrough, and a portion of the outer surface of said annular porous mass forming a wall surface of said chamber, whereby metered flow of the secondary fluid is produced through said annular porous mass.

3. A self metering fluid mixing device comprising a hollow container adapted for connection at one end to a source of pressured primary fluid, partition means in said container dividing the interior into two compartments, one of said compartments providing a passage for primary fluid flow through said container, a flexible diaphragm wall mounted across the other of said compartments to define a chamber adapted to contain a secondary fluid, isolated from the primary fluid but subject to the pressure thereof, and a porous mass forming part of said partition means and disposed intermediate said one compartment and said chamber.

4. A self metering fluid mixing device comprising a hollow container adapted for connection at one end to a source of pressured primary fluid, partition means in said container dividing the interior into a central through fluid passage and a surrounding annular compartment exposed at one end to primary fluid entering said container, an annular flexible diaphragm mounted between said partition means and said container to define an enclosed chamber in said annular compartment at the other end thereof, said chamber being adapted to contain a secondary fluid, whereby the secondary fluid is isolated from the primary fluid but subjected to the entering pressure of the primary fluid, means in said central fluid passage for reducing the pressure of the primary fluid flowing therethrough, and a porous mass of sintered metal particles forming part of said partition means and disposed intermediate said chamber and the low pressure portion of said central fluid passage.

5. A self metering fluid mixing device comprising a hollow cylindrical container adapted for connection at one end to a source of pressured primary fluid, a sleeve centrally inserted in said container to divide the interior thereof into a central through passage and a surrounding annular compartment, means providing fluid passage from said central fluid passage into one end of said annular compartment, an annular piston mounted on said sleeve and axially movable relative thereto to define in the other end of said annular compartment a chamber adapted to contain a secondary fluid, whereby said secondary fluid is isolated from the primary fluid but subjected to the pressure thereof, a Venturi nozzle member disposed in said central fluid passage for reducing the pressure of primary fluid flowing therethrough, at least a portion of said nozzle member being formed of a porous mass, said porous mass being disposed intermediate said annular chamber and the low pressure portion of said central fluid passage.

6. A self-metering fluid mixture device comprising means defining a fluid flow passage adapted for the flow of pressured primary fluid therethrough, fluid flow restricting means in said passage dividing said passage into relatively high pressure and low pressure zones, a separate chamber adjacent said passage, a movable fluid-impermeable barrier in said chamber dividing the same into two compartments, means venting the fluid pressure of said high pressure zone into one of said compartments to effect movement of said barrier toward the other of said compartments, said other of said compartments being adapted to contain a secondary fluid, and a porous fluid-permeable partition interposed between said other of said compartments and the low pressure zone of said passage, movement of said barrier toward said other of said compartments subjecting secondary fluid therein to the pressure of said high pressure zone to force secondary fluid through said partition, thereby intermingling secondary fluid with primary fluid.

WILBUR A. SCHAICH.

REFERENCES CITED

The following references are of record in the file of this patent:

UNITED STATES PATENTS

| Number | Name | Date |
|---|---|---|
| 2,153,240 | Dailey | Apr. 4, 1939 |
| 2,323,618 | Ottoson | July 6, 1943 |
| 2,440,580 | Gazda | Apr. 27, 1948 |

FOREIGN PATENTS

| Number | Country | Date |
|---|---|---|
| 11,951 | Great Britain | Aug. 18, 1915 |
| 235,672 | Great Britain | June 25, 1925 |